(12) United States Patent
Duke et al.

(10) Patent No.: US 11,599,619 B1
(45) Date of Patent: *Mar. 7, 2023

(54) RELATIVE AND DYNAMIC MULTIFACTOR AUTHENTICATION

(71) Applicant: Wells Fargo Bank, N.A., San Francisco, CA (US)

(72) Inventors: Michael T. Duke, Monroe, NC (US); Kourtney Eidam, Marietta, GA (US); Christopher P. Clausen, Novato, CA (US); Darrell L. Suen, San Ramon, CA (US); Melody Kao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,482

(22) Filed: Dec. 15, 2021

Related U.S. Application Data

(63) Continuation of application No. 16/421,122, filed on May 23, 2019, now Pat. No. 11,222,106, which is a continuation of application No. 14/689,606, filed on Apr. 17, 2015, now Pat. No. 10,303,869.

(51) Int. Cl.
  *G06F 21/36* (2013.01)
  *G06F 21/32* (2013.01)
  *G06F 21/34* (2013.01)

(52) U.S. Cl.
  CPC .............. *G06F 21/36* (2013.01); *G06F 21/32* (2013.01); *G06F 21/34* (2013.01)

(58) Field of Classification Search
  CPC .......... G06F 21/36; G06F 21/34; G06F 21/32; G06F 21/31
  See application file for complete search history.

(56) References Cited

U.S. PATENT DOCUMENTS

| | | | |
|---|---|---|---|
| 5,626,140 A | 5/1997 | Feldman | |
| 6,522,772 B1 | 2/2003 | Morrison et al. | |
| 7,249,263 B2 | 7/2007 | Chaudhari et al. | |
| 7,769,207 B2 | 8/2010 | Olivo, Jr. et al. | |

(Continued)

OTHER PUBLICATIONS

"U.S. Appl. No. 14/689,606, Advisory Action dated Aug. 7, 2017", 3 pgs.

(Continued)

*Primary Examiner* — Amie C. Lin
(74) *Attorney, Agent, or Firm* — Schwegman Lundberg & Woessner, P.A.

(57) ABSTRACT

Provided is relative multifactor authentication for interactions between users and one or more entities. Relative multifactor authentication includes monitoring a set of attributes associated with a user during an interaction between the user and the entity. The set of attributes include at least two of a behavioral attribute, a health attribute, a geospatial attribute, and a device attribute. Relative multifactor authentication also include comparing respective parameters of attributes of the set of attributes with expected parameters and determining an authentication status based on the comparison and weighted values assigned to respective attributes of the set of attributes. The user is selectively authenticated to begin to continue the interaction based on the authentication status.

20 Claims, 8 Drawing Sheets

(56) References Cited

U.S. PATENT DOCUMENTS

| | | | |
|---|---|---|---|
| 8,584,219 | B1 | 11/2013 | Toole et al. |
| 10,303,869 | B1 | 5/2019 | Duke et al. |
| 11,222,106 | B1 | 1/2022 | Duke et al. |
| 2008/0114697 | A1 | 5/2008 | Black et al. |
| 2009/0238418 | A1* | 9/2009 | Sato .................. G06V 30/2504 382/115 |
| 2010/0011561 | A1 | 5/2010 | Tredoux et al. |
| 2010/0281059 | A1 | 11/2010 | Lynch |
| 2014/0130127 | A1* | 5/2014 | Toole .................. G06F 21/316 726/3 |
| 2016/0132773 | A1* | 5/2016 | Chandrasekaran .......................... G06F 16/9032 706/11 |

OTHER PUBLICATIONS

"U.S. Appl. No. 14/689,606, Advisory Action dated Sep. 13, 2018", 5 pgs.

"U.S. Appl. No. 14/689,606, Examiner Interview Summary dated Feb. 16, 2018", 3 pgs.

"U.S. Appl. No. 14/689,606, Final Office Action dated May 17, 2018", 29 pgs.

"U.S. Appl. No. 14/689,606, Final Office Action dated May 18, 2017", 20 pgs.

"U.S. Appl. No. 14/689,606, Non Final Office Action dated Oct. 12, 2017", 21 pgs.

"U.S. Appl. No. 14/689,606, Non Final Office Action dated Nov. 2, 2016", 15 pgs.

"U.S. Appl. No. 14/689,606, Notice of Allowance dated Jan. 15, 2019", 17 pgs.

"U.S. Appl. No. 14/689,606, Pre-Appeal Brief Request filed Oct. 17, 2018", 5 pgs.

"U.S. Appl. No. 14/689,606, Response filed Jan. 12, 2018 to Non Final Office Action dated Oct. 12, 2017", 17 pgs.

"U.S. Appl. No. 14/689,606, Response filed Feb. 2, 2017 to Non Final Office Action dated Nov. 2, 2016", 12 pgs.

"U.S. Appl. No. 14/689,606, Response filed Jul. 17, 2018 to Final Office Action dated May 17, 2018", 20 pgs.

"U.S. Appl. No. 14/689,606, Response filed Jul. 18, 2017 to Final Office Action dated May 18, 2017", 10 pgs.

"U.S. Appl. No. 14/689,606, Response filed Sep. 18, 2017 to Advisory Action dated Aug. 7, 2017", 10 pgs.

"U.S. Appl. No. 16/421,122, Advisory Action dated Aug. 11, 2021", 3 pgs.

"U.S. Appl. No. 16/421,122, Examiner Interview Summary dated Mar. 3, 2021", 2 pgs.

"U.S. Appl. No. 16/421,122, Final Office Action dated Jun. 3, 2021", 34 pgs.

"U.S. Appl. No. 16/421,122, Non Final Office Action dated Dec. 24, 2020", 29 pgs.

"U.S. Appl. No. 16/421,122, Notice of Allowance dated Sep. 3, 2021", 15 pgs.

"U.S. Appl. No. 16/421,122, Response filed Mar. 19, 2021 to Non Final Office Action dated Dec. 24, 2020", 10 pgs.

"U.S. Appl. No. 16/421,122, Response filed Jul. 29, 2021 to Final Office Action dated Jun. 3, 2021", 11 pgs.

"U.S. Appl. No. 16/421,122, Response filed Aug. 16, 2021 to Advisory Action dated Aug. 11, 2021", 11 pgs.

\* cited by examiner

# RELATIVE AND DYNAMIC MULTIFACTOR AUTHENTICATION

CROSS-REFERENCE TO RELATED APPLICATIONS

This application is a continuation of U.S. application Ser. No. 16/421,122, filed May 23, 2019, now issued as U.S. Pat. No. 11,222,106, which is a continuation of U.S. application Ser. No. 14/689,606, filed Apr. 17, 2015, now issued as U.S. Pat. No. 10,303,869, and entitled "RELATIVE AND DYNAMIC MULTIFACTOR AUTHENTICATION," the entirety of each of which are incorporated herein by reference.

BACKGROUND

Authentication is the process of determining whether a person is the actual person they are asserting themselves to be. A common type of authentication is based on logon passwords. As it relates to financial institutions, for example, a customer may access and transact with one or more of the customer's financial institution(s) accounts through a variety of channels. As non-limiting examples, a customer's physical credit card may be used to make purchases at a point of sale and/or a credit card number may be used to make purchases online. In other examples, the customer's account information may be accessed and viewed through a financial institution's website, the customer may manage an account through a phone bank, and so on. Although these options provide increased access and convenience for the customer, each of these channels also provides opportunities for fraudulent access. Additionally, some channels of access may be more prone to fraud, either through vulnerabilities of those channels, or because fraud is more common through such channels. On the user side, an occurrence of fraud (e.g., compromised financial data, monetary loss, identify theft, and so on) as well as the need to provide authentication information (e.g., series of questions need to be answered when speaking with a representative on the phone) have been blamed for user dissatisfaction. On the network side, the diverse number of channels and the proliferation of fraud have amplified the importance of proper authentication.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include an observation component that monitors a set of attributes (or contexts) associated with a user during an interaction between the user and an entity and an evaluation component that compares respective parameters of attributes of the set of attributes with expected parameters. The computer executable components may also include an analysis component that determines an authentication status of the user based on the comparison and weighted values assigned to respective attributes of the set of attributes. Further, the computer executable components may also include an authentication component that selectively authenticates the user as a function of the authentication status.

Another aspect relates to a method that may include comparing, by a system comprising a processor, a set of parameters obtained at substantially the same time as an interaction between a user and an entity with a set of historical parameters. The method may also include applying, by the system, respective weighted values to parameters of the set of parameters as a function of the interaction and an observed condition of the user. Further, the method may include performing, by the system, one of the following based on whether the sum of the weighted values is within or is outside a threshold range of values. Based on a determination that the sum of the weighted values is within a threshold range of values, the method may include verifying an identity of the user and continuing the interaction. Alternatively, based on a determination that the sum of the weighted values is outside the threshold range of values, the method may include suspending the interaction (at least temporarily) and requesting additional authentication criteria from the user.

Yet another aspect relates to a computer-readable storage device storing executable instructions that, in response to execution, cause a system comprising a processor to perform operations. The operations may include monitoring a set of attributes associated with a user during an interaction between the user and an entity. The set of attributes may comprise at least two of a behavioral attribute, a health attribute, a geospatial attribute, and a device attribute. The operations may also include comparing respective parameters of attributes of the set of attributes with expected parameters and determining an authentication status based on the comparison and respective weighted values assigned to the attributes of the set of attributes. Further, the operations may include selectively authenticating the user based on the authentication status.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
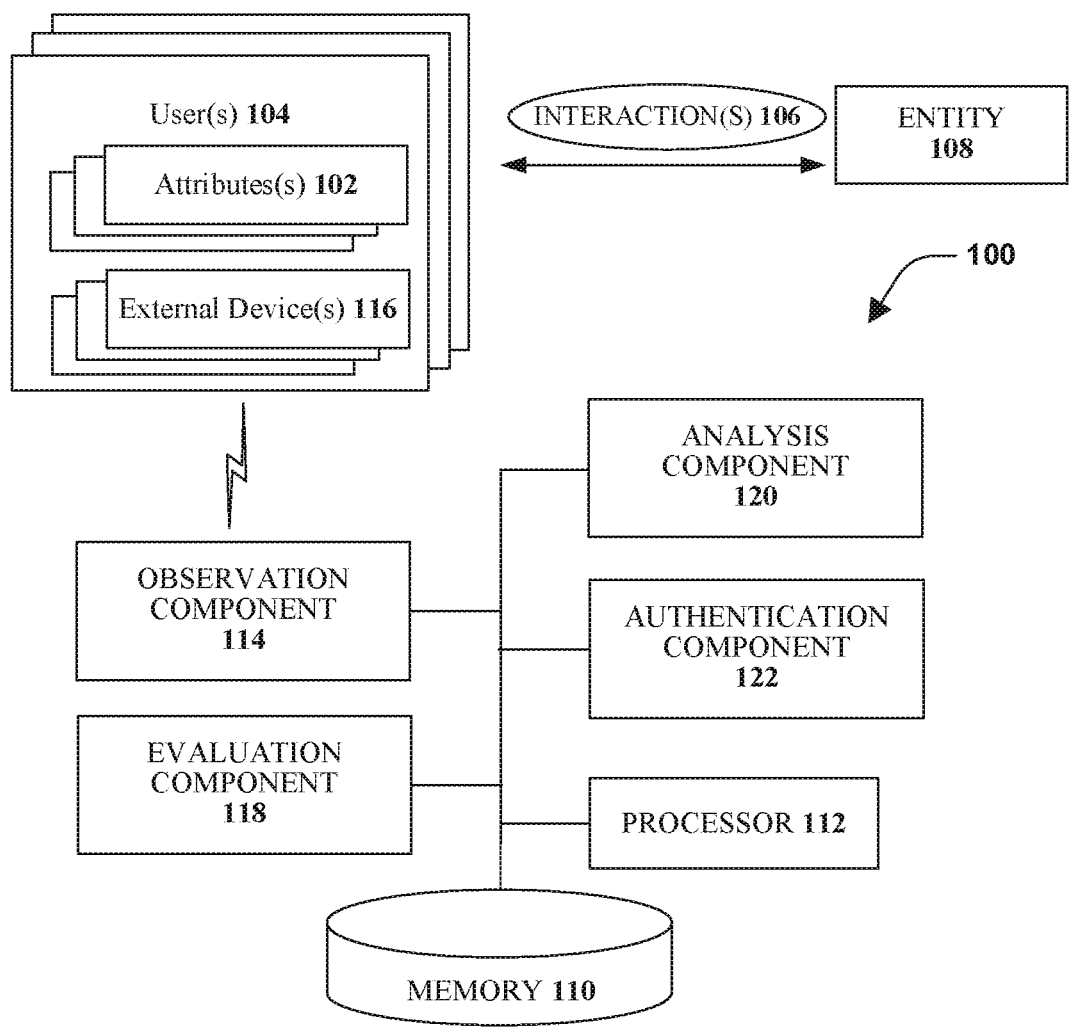
FIG. 1 illustrates an example, non-limiting implementation of a system configured for relative and dynamic multifactor authentication, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

One or more aspects disclosed herein relates to a relative multifactor authentication that may be utilized to determine whether a user is authorized to conduct one or more interactions with an entity. As used herein an "entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution. Further, as used herein a "user" refers to a customer of the financial institution and/or one or more devices managed by the customer.

Based on a rules-based pattern, the relative multifactor authentication may be utilized to dynamically apply a weighted value to one or more attributes taken into account when users conduct interactions with the entity. As used herein an "interaction" may be any touch point or transaction between the financial institution (e.g., entity) and the user. The relativity of the multifactor authentication is the level of authentication needed relative to the type of interaction (e.g., transaction) between the entity and the user. Alternatively or additionally, the level of authentication may be based on the absence of a typical or usual factor, which triggers the need for an alternate factor leveraging a context function.

The relative multifactor authentication may be applied in real-time and may be constantly updated or applied. This constant, real-time authentication process may be performed at a micro-interaction level. Further, the constant, real-time authentication may apply to multiple linked devices simultaneously, at substantially the same time, or at different times. The seamless, back-end device communication may contribute to a patterning of the user for authentication purposes. The patterning refers to attributes that are common the user, habits of the user, consistent behavior, or other data that may be tracked and considered "normal" for the user.

Further, the relative multifactor authentication may incorporate the pairing, coordination, monitoring, and communication of devices. These devices may include, but are not limited to, smartphones, smart watches, activity tracking devices, health monitoring devices, augmented reality devices (e.g., augmented reality headsets or heads-up displays, both wearable and non-wearable), vehicles (e.g., through near field communication, Bluetooth, or other communication technologies), and so on. These devices may also include appliances, vehicles, and other types of objects that have communication capability. The devices may include internet of things (IoT) devices that are under the control of and/or in proximity to the user. Further, the IoT devices may be external sensors and/or monitors associated with an object or a place (e.g., bank branch, ATM, merchant linked to the financial systems, and so on).

FIG. 1 illustrates an example, non-limiting implementation of a system 100 configured for relative and dynamic multifactor authentication, according to an aspect. The system 100 may be configured to combine one or more monitored attributes 102 to ascertain dynamically whether a user 104 should be authenticated with the system 100 and allowed to conduct one or more interactions 106 with an entity 108.

The relative multifactor authentication discussed herein is distinguishable from general authentication since relative multifactor authentication is not a one-time response, but a process that is continually authenticating in real time (e.g., at a micro-interaction level). For example, in traditional authentication systems, a customer goes to the automated teller machine (ATM), for example, and has to pass a card-and-pin first level of authentication. Once the customer is authenticated, the interaction or a number of interactions may be undertaken during the ATM session with the single authentication.

However, with relative multifactor authentication as discussed herein, the ATM user is authenticated as he transitions from screen to screen (maybe not even with his knowledge). This continual authentication is utilized to make sure that the person is the same person doing all the interactions (e.g., the authenticated user did not walk away with the session still open and a rogue user took over the ATM).

In another example, the continual authentication may be utilized to determine if the user's blood pressure range has spiked (e.g., the user is nervous or scared and may be under attack). For example, the user may be asked to say, "Hello!" during the process to verify the voiceprint. In most circumstances, the authenticating process will not be noticeable to the user. If the factors change, the session may be automatically shut down, restarted, or another action taken. In an example, the other action may be that a picture of the user at the ATM is taken in the case of a suspected theft during the ATM withdrawal process. In another example, facial recognition is initiated by guiding the user to look at something and validating that the picture is of the user and not a criminal.

The system 100 may include at least one memory 110 that may store computer executable components and/or computer executable instructions. The system 100 may also include at least one processor 112, communicatively coupled to the at least one memory 110. The at least one processor 112 may facilitate execution of the computer executable components and/or the computer executable instructions stored in the memory 110. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 110 (e.g., operatively connected to the memory 110), the various aspects are not limited to this implementation. Instead, in accordance with various implementations, the one or more computer executable components and/or the one or more computer executable instructions may be stored in (or integrated within) the memory 110. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 100 may also include an observation component 114 that may be configured to monitor the one or more attributes 102 associated with the user 104. Further, the observation component 114 may be configured to monitor respective attributes associated with a multitude of users.

The observation component 114 may directly capture the information related to the one or more attributes 102 and/or may interface with one or more external devices 116 that may be configured to monitor respective parameters of the one more attributes 102. The various attributes may be current attributes, benchmark (e.g., historical) attributes, or updated benchmarks. At least a subset of the attributes may be collected in association with the user independent of the transaction. For example, user behavior may be tracked in other interactions and compared to another transaction (such as a high value transaction), or multiple other transactions. In another example, user and/or device movement may be tracked and compared with a current context. The comparison may indicate where the user and/or the device was at during a previous time to where the user and/or device is at currently.

The one or more external devices 116 may be wearable devices or non-wearable devices. In some implementations, at least a subset of the one or more external devices 116 may be controlled by the user. However, according to some implementations, some or all of the external devices 116 might not be controlled by the user. Instead, the devices may be under control of a bank (or other financial entity), a merchant, or another entity. In another example, a first set of devices may be controlled by a financial entity, a second set of devices may be controlled by a merchant, a third set of devices may be controlled by the user, and so on.

The observation component 114 and/or the one or more external devices 116 may be configured to monitor parameters associated with geospatial attributes, biological attributes, health attributes, device attributes, and other types of attributes. In accordance with some implementations, two or more external devices may coordinate communication with the observation component 114 to convey the monitored parameters to the observation component 114. In some implementations, the two or more external devices may be paired.

The geospatial attributes may relate to various locations of the user including, but not limited to, where the user typically travels, duration of travel, duration of time at a particular location, activities performed at the location, and so on. The biological attributes and/or health attributes may relate to biometrics, physiological attributes, physical attributes, and so forth. The device attributes may relate to whether attributes of a user (e.g., biometrics) match attributes of a known device, for example (e.g., is the device located at the same place as the user).

An evaluation component 118 may be configured to compare parameters associated with each of the one or more attributes 102 with expected parameters. For example, a typical heart rate of a user may be between 72 and 75 beats per minute. Thus, the evaluation component 118 may compare the heart rate currently being monitored with the typical (for this user) heart rate for certain types of interaction or context. If the currently monitored heart rate falls between 72 and 75 beats per minute, according to this example, there is a match. However, if the currently monitored heart rate is below 72 beats per minute, or above 75 beats per minute, there is no match and additional authentication measures may be taken, as will be discussed in further detail below.

An analysis component 120 may be configured to determine if a user should be authenticated or should not be authenticated (e.g., authentication status). The determination may be based on weighted values that are applied based on the type of interaction attempting to be conducted with the entity, parameters associated with the interaction, and/or parameters associated with the user. For example, the type of interaction may be through an online website, over the telephone, in person at a banking institution, and so on. Parameters associated with the interaction may include, but are not limited to, inquiry, change of contact information, financial deposit, financial withdrawal, transfer of funds, purchase, and so on.

In some implementations, each attribute may have the same weighted value. For example, if there are two attributes, each attribute may contribute 50% of the total value. In another example, if there are three attributes, each attribute may contribute one-third of the total value.

In other implementations, each attribute may have different values. For example, if there are three attributes, a first attribute may be weighted more heavily than a second attribute, which may be weighted more heavily than a third attribute. Continuing this example, the first attribute may be worth 50% of the total value, the second attribute may be worth 30% of the total value, and the third attribute may be worth 20% of the total value. According to some implementations, the three attributes may include one geospatial attribute, one biological/health attribute, and one device attribute.

The weighted values may be totaled to determine if the sum of the values is within a threshold range of values for the type of interaction. A range of values is utilized because there may be times when a monitored attribute is not exactly as expected. For example, a user may have a cold or was running to the ATM and is breathing differently, their voice pattern is different, or their heartbeat is faster than normal. Accordingly, there may be a variance compared to what is considered normal for the user and the variance may be considered acceptable.

An authentication component 122 may be configured to selectivity authenticate the user based on the determination by the analysis component 120. For example, if the combination or total value of the attributes, after the weighted values or percentages are applied, is within a defined tolerance level, the user may be automatically authenticated to perform the interaction. However, if the weighted values or percentages are outside the defined tolerance level, one or more additional actions may be necessary before the user is authorized or a determination is made that the user should not be authorized. According to some implementations, if the weighted values or percentages are outside the defined tolerance level, authentication of the user may be automatically denied.

The additional actions may be performed within the interaction session, outside the session, or both inside (e.g., during) the session and outside the session. For example, a new or additional step may be output to the user (e.g., on a screen, through speakers, and so on). In another example, activation of an auxiliary function by the user may be necessary. According to another example, an out of band confirmation and/or use of a token code may be used as the additional action.

In an implementation, by using context-specific dynamic weightings of multi-factor continuous authentication techniques the weighted value may be determined. In an example, a feedback loop adjusts the weightings and may prompt the user to generate further data in response to lower confidence levels.

According to various implementations, the user is provided the opportunity to choose whether the user would like the entity to monitor various attributes of the user. Thus, when a relationship is established between the user and the entity, or at a different time, the user is able to allow the monitoring by the entity as discussed herein (e.g., opt-in). If the user changes his or her mind, the user is able to discontinue the monitoring of the entity (e.g., opt-out). Although there may be some attributes for analysis that a user may control (e.g., allow usage, do not allow usage, and so on), there may be other attributes that the entity may monitor or control, without the need for user consent (e.g., interaction history with that entity).

In some implementations, there may be various incentives provided to a user that selects to "opt in" for the authentication as discussed herein. The relative multifactor authentication is another level of verification that may be utilized separately or in conjunction with other levels of verification. If the user allows the entity to authenticate the user as discussed herein, the entity may return to the customer a value in kind. For example, the relative multifactor authentication may reduce the occurrence of fraud and, therefore, reduce the overhead costs associated with fraud because a confidence level is achieved since the entity knows the user is the user authorized to conduct the interaction. Thus, the user may receive reduced fees, increased interest rates, reduced loan rates, and/or other benefits. Accordingly, the user is dynamically rewarded in return for utilizing higher levels of authentication at the time of the interaction and the reward is tied to the interaction. Further, the dynamic reward may be based on the use of particular techniques, such as the user agreeing to wear a tracking device that may be sensed during an interaction. For example, the user may obtain credits or other forms of rewards based on the use of the particular technique.

According to some implementations, customer biometric profiles may be utilized for risk decision-making and authentication. A customer biometric profile may consist of markers that are unique to the individual customer. The markers may be a combination of biometric static elements and entity-determined dynamic elements (e.g., device ID or software). Examples of static biometrics elements may include, but are not limited to, fingerprint, voice timbre (as compared to voice-related behavior-metric such as slang/words used), retina, pulse/electrocardiograms or any product that uses wearables and/or ECG technology may be used for authentication.

The customer biometric profiles may be used across different channels. Further, the entity may use third-party identification sources (e.g., government agencies) to match against customer biometric static elements in order to authenticate the customer.

According to an aspect, a decision algorithm (used by analysis component 120) may be dynamic. The entity may determine which marker to request based on a number of factors. In an example use case related to the type of channel used, if a customer is in a store, s/he may not need a biometric confirmation. However, if the user is calling a phone bank, the customer may need to match a voice print.

In an example use case related to interaction history, when the customer is attempting an atypical interaction (compared to the customer's past interaction records), a biometric confirmation may be requested before the interaction is completed.

According to some implementations, a customer may reset the dynamic elements (e.g., when a new device is purchased), however, the biometric elements would not change. Alternatively, the biometric elements may change and the changes may be gradually updated through self-learning or machine learning.

Further, if a customer is willing to provide more information about themselves to enhance their biometric profiles, the customer may be identified and authenticated more easily (similar to an airport security "fast" line or TSA Pre-Screen program). For example, the customer may be identified based on gender, age, hair color, eye color, height, weight, and so on.

In some implementations, customer preferences may be selective for biometric usage by channel. Thus, customers may be able to customize which biometric marker should be used for authentication by channel. For example, a customer may want to use a retinal scan for their phone instead of a fingerprint. By customizing the preference to the interaction type, security may be added. Further, there may be a user selection through available options for use with alternatives to be used randomly based on risk, which adds dynamic seamless action.

Figure 2:
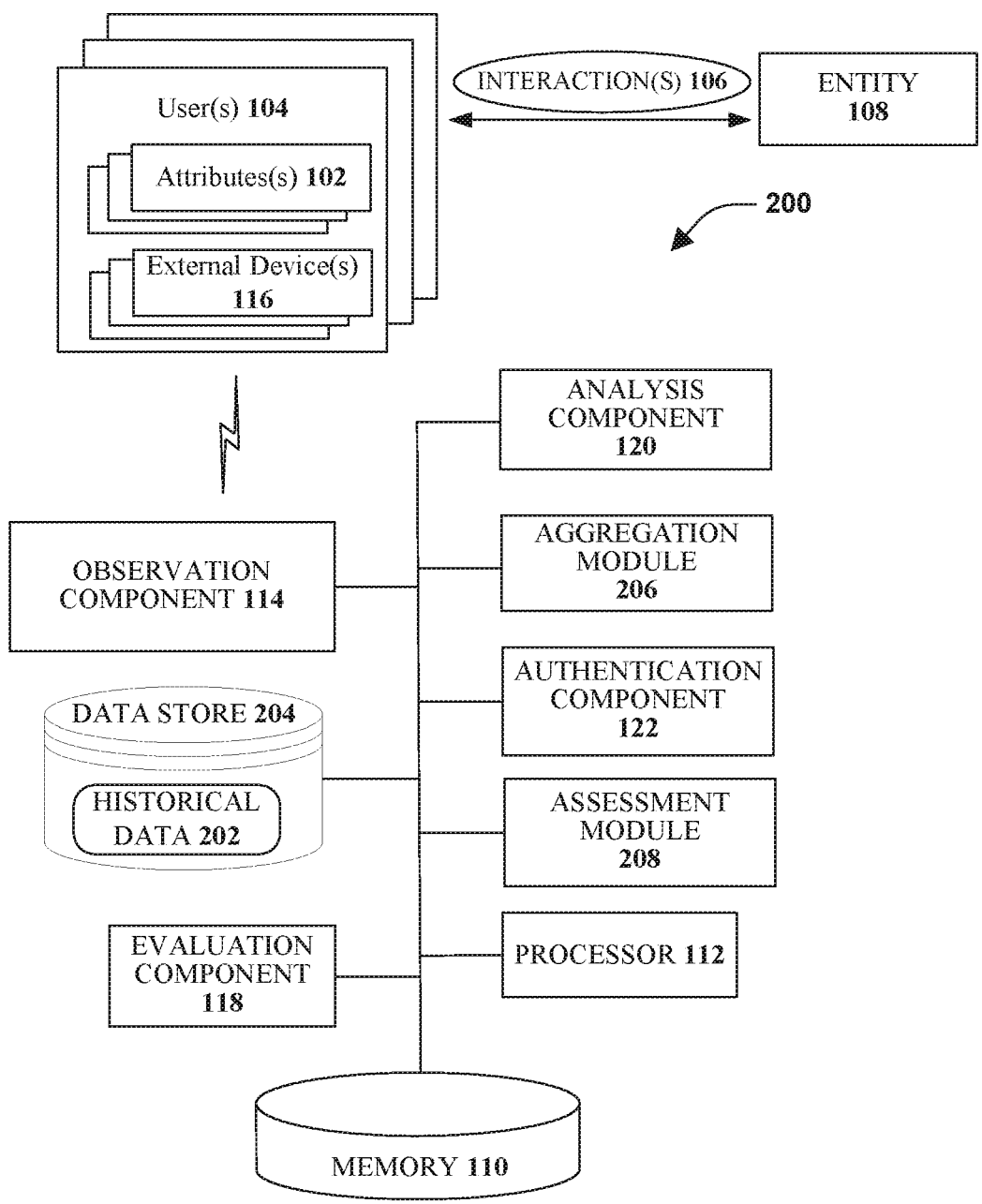
FIG. 2 illustrates an example, non-limiting system configured for seamless user authentication, according to an aspect.

FIG. 2 illustrates an example, non-limiting system 200 configured for seamless user authentication, according to an aspect. During a customer's interactions with an entity (e.g., financial institution), the customer may exhibit certain repeated "behaviors" that may become a part of the customers behavior metric profile. The behavior metric profile may consist of markers that are unique to the individual customer, and may include unique-to-customer static behavior-based elements and bank-determined dynamic elements, such as customer mobile device ID, proximity devices, software, and so on. Examples of behavior metric elements include, but are not limited to, comparing typing entries (e.g., misspellings, abbreviations, and so forth) with historical inbound communications, typing rhythm, swipe pattern on mobile device, voice inflections, words used, and the like. The entity may optimize which marker to ask for based on the customer's access channel and interaction history, for example. If the customer is willing to provide extra behavior-metrics, the customer may be identified more quickly, in a sort of "TSA pre-check" accelerated authentication.

The various aspects discussed herein relate to securing every touch point or interaction 106 between the user 104 and the entity 108, not just the first (e.g., initial) interaction, which may increase interactivity between the user 104 and the entity 108. For example, when a user access an online banking feature, the users device is authenticated during the initial interaction. Thereafter, according to conventional systems, for the next seven or so interactions, it may be automatically assumed that the user of the device is the same person (even if this is in fact not the case!). Thus, in accordance with the disclosed aspects, the next seven or so interactions are performed after an automatic and seamless authentication procedure is conducted at the micro-interaction level as discussed herein.

In order to authenticate the user seamlessly, historical data 202 (e.g., behavior metric profile) associated with the one or more attributes 102 may be determined and retained in a data store 204. According to some implementations, the data store 204 may be integrated, at least partially, with one or more other system 200 components and/or the memory 110.

According to other implementations, the data store 204 may be retained external to the system 200, wherein the system 200 may access the external source as needed to access the historical data 202.

For example, during a monitoring period (e.g., over a span of a few days, a week, two weeks, a month, and so on), the observation component 114 may be configured to monitor one or more attributes 102 associated with at least one user 104. During the monitoring period, or when the user 104 registers with the system 200, the user 104 may provide an indication of one or more external devices 116 that are associated with the user 104. The one or more external devices 116 may be proximity devices, wearable devices (e.g., a health monitoring device, an activity monitoring device, a wristwatch; jewelry, tracking devices, or other objects that includes communication capabilities, and so on). Other examples of wearable devices may include implanted devices (e.g., a pacemaker, microchip, smart tattoo, cardioverter-defibrillator, and so forth). Additionally or alternatively, the one or more external devices 116 may be other types of devices or objects that are associated with the user. Examples of these devices or objects include communication devices (both wired and wireless), a vehicle, an object with an RFID chip or other communication mechanism, and so on.

Based on the observations made over the monitoring period, typical or expected values or range of values associated with authentication attributes may be determined for the user 104. According to some implementations, values associated with the authentication attributes may be monitored over time, at scheduled intervals, periodically, based on detection of an event, and so on. Thus, the monitoring of the user 104 may be performed and an authentication attribute may be updated independent from a specific interaction. For example, over time a users heart rate may increase due to various medical conditions and may stay at this increased heart rate. Accordingly, the related authentication attribute may be updated to reflect the more appropriate (and up to date) value for the attribute.

When the user 104 attempts to initiate the interaction 106 with the entity 108, the observation component 114 may obtain one or more current attributes 102. These current attributes may be obtained directly by observation component 114 and/or through one or more of the external devices 116.

The attributes (both historical and current) may be placed into different categories include geospatial, biological/health, and/or device categories. The geospatial category may include information related to where the user typically goes (e.g., a location), such as home, work, a store, a coffee shop, a school, a central location, and so on. The geospatial category may also relate to geolocation relationships. The geolocation relationships may include, the route the user travels to get to the location, for how long the user remains at the location, what the user does at the location, how often the user goes to the location (e.g., daily, weekly, bi-weekly, every three months, every six months, once a year), and so on. Pathing associated with the geospatial category may include information related to the user consistently going to the grocery store on Elm Drive, the grade school on Smith Circle, and the coffee shop on Spruce Road. Patterns associated with the geospatial category may include information related to the fact that the user visits the ATM by his office on Mondays and Fridays and typically withdraws $100 during each visit.

The biological/heath category includes information related to biometrics, physiological, and/or physical attributes. The monitoring by the observation component 114 (or one or more external devices 116) in this category may include, but is not limited to, the number of steps the user takes daily, the user's average blood pressure, the user's average heart rate range, normal stride size, typical sleep patterns, and so on. According to some implementations, measurements may be made of the electro dermal system, cardiovascular system, musculoskeletal system, nervous system, ocular system, eccrine system, lips, facial expressions, pupillary dilation, brainwaves, breathing rate, vocal characteristics, blood pressure, heart rate, and heart rate variability, and so on.

The device category may include whether biometrics of the user match the known device(s). Monitoring by the observation component 114 (or one or more external devices 116) may include determining the device (e.g., phone, vehicle, and so on) is with the user at the time the interaction is initiated and throughout the entire interaction. Monitoring may also include the device or a set of devices (e.g., the external device 116) taking a random sample of the user's voice (e.g., voiceprint) to verify the user is present when the interaction is initiated or at some point during the interaction. In some implementations, facial recognition may be utilized. In another example, monitoring by the observation component 114 may include determining a known vehicle (or typical vehicle) is present and connected to an authorized device (through a wired or wireless communications media) when the interaction with the entity is initiated. In another example, a device parameter may include checking with a carrier to make sure the user still owns the phone (and has not reported in stolen). In another example, if a child takes a parent's debit card and knows the pin number for the card, one or more other forms of authentication discussed herein would fail, which may mitigate the child being able to withdraw money from a parent's account.

The evaluation component 118 may be configured to compare the current attributes 102 with the associated historical data 202. Based on a result of the comparison by the evaluation component 118, the analysis component 120 may be configured to determine if the user should be authenticated. For example, an aggregation module 206 may be configured to combine two or more attributes to assist the analysis component 120 with performing the authentication analysis. According to some implementations, the aggregation module 206 may be configured to combine attributes across the different categories of attributes. In one implementation, the aggregation module 206 may be configured to combine one attribute from the geospatial category, one attribute from the biological/health category, and one attribute from the device category. The different combinations of attributes may facilitate a more complete and accurate determination related to identification of the user.

By tracking and combining the attribute data, the evaluation component 118 and/or the analysis component 120 may review the combination for an authentication nominal variance. If the combination results in a value that is within the expected value range of the authentication nominal variance, the user 104 may be automatically validated by the authentication component 122 and the interaction 106 may proceed. However, if the resulting value is outside the range of the authentication nominal variance, additional information may be solicited from the user 104 by an assessment module 208.

For example, during an initiation request (or at some other time during the interaction 106) the users blood pressure changes dramatically and the user is taking shorter (or longer) steps than the user did previously. Further, geospatial activities of the user are abnormal. In this case, the assessment module 208 may ask the user to take additional steps (e.g., actions) in order to be validated to make an ATM withdrawal or an online purchase. According to an example, the extra action may include a temporary pin challenge response where a temporary code that is only active for a short time period is sent to a known device associated with the user. Additionally or alternatively, the extra action may include asking a predetermined security question that must be answered correctly before the user is authorized to proceed or taking a picture for facial recognition or for object recognition.

In another example, the user is at an ATM and the extra action may include the assessment module 208 instructing the user to go to the teller inside the bank to complete an interaction. In some cases, the assessment module 208 may request a third party referral. Thus, the assessment module 208 (or another system 200 component) may send a text message (or another type of communication) on behalf of the user asking the third party to verify that the user is in fact the person he says he is. The communication may be sent to a known friend or family member based on various criteria including geolocation, near field communication, opt-in, and so forth. The user may have to go through these and/or other extra actions when there is some discrepancy in the pattern of attributes.

In some implementations, even if the attributes of the user pass the threshold level as determined by the analysis component 120, the type and/or amount of the interaction may initiate the assessment module 208 to add additional authentication steps to the interaction 106. For example, if the type of withdrawal or other interaction is associated with a high amount of fraud, the user may need to perform one or more extra actions. In another example, if the type of interaction is not typical for the user (e.g., an uncharacteristic wire transfer), the assessment module 208 may inform the user extra authentication actions are necessary. In another example, the extra authentication actions may be initiated by the assessment module 208 based on a dollar amount of the interaction being higher than a threshold amount (e.g., over $500, over $2,000, over $5,000, and so on).

Figure 3:
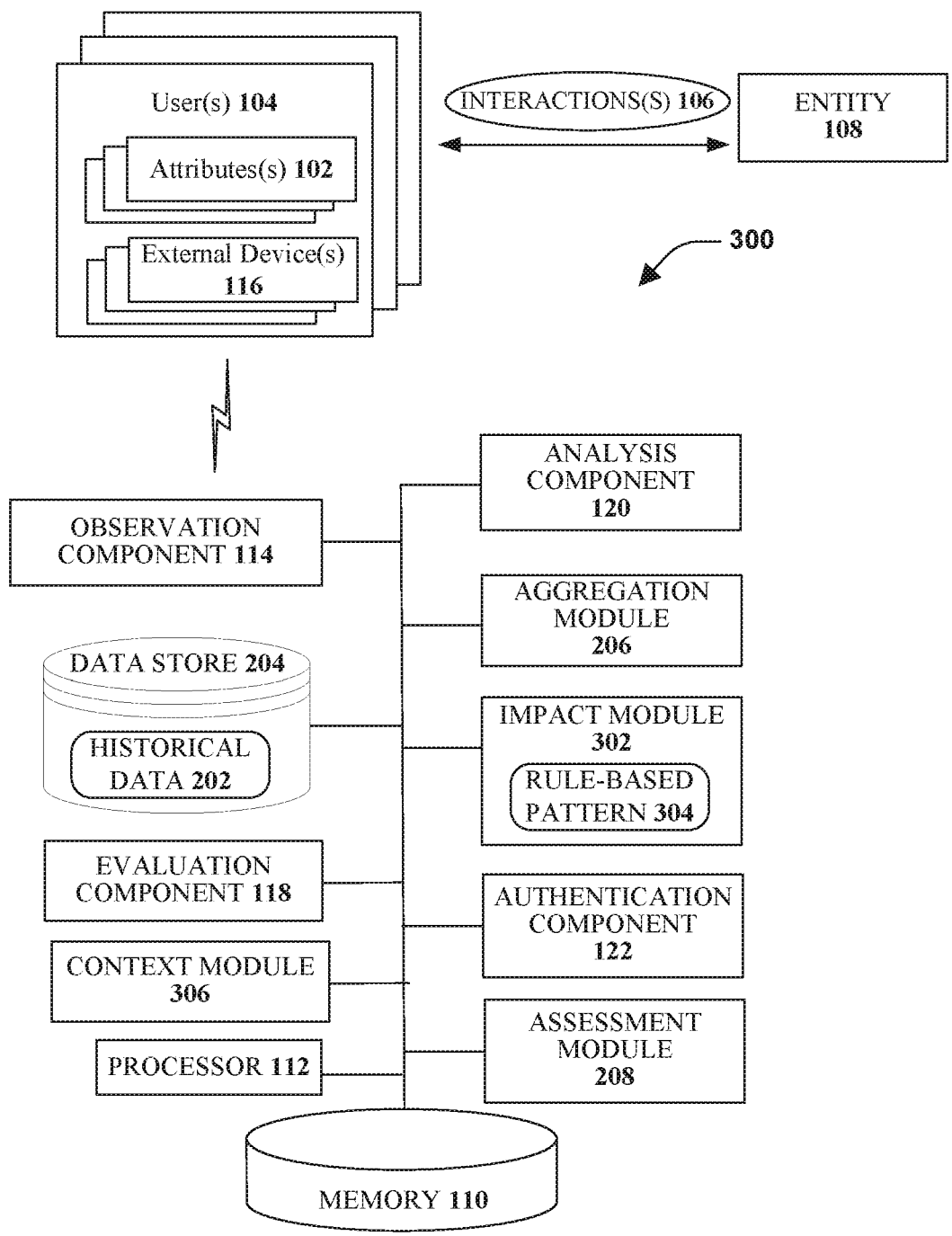
FIG. 3 illustrates an example, non-limiting system configured for dynamic authentication, according to an aspect.

FIG. 3 illustrates an example, non-limiting system 300 configured for dynamic authentication, according to an aspect. The relative dynamic authentication and the levels of authentication necessary for a particular user is relative to the type of conversation (e.g., interaction) the user is having with the entity. The relativity of the interaction may tie directly into a rule pattern of how much authentication will be requested. The disclosed aspects attempt to reduce the burden related to the authentication needed by performing a large amount of the authentication seamlessly, sometimes without the user being aware of what is occurring relative to the authentication.

As discussed herein, there are at least three general categories of attributes that may be analyzed to determine whether a user 104 should be authenticated for a particular interaction 106 with an entity 108. The authentication level may be based on the interaction type, interaction amount, context, and/or other considerations (e.g., historical data, previous interactions, and so on).

When the evaluation component 118 compares the historical data 202 and the attributes 102 obtained by the observation component 114, one or more attributes from each of the different categories may be combined by the aggregation module 206. The different categories of attributes are the factors that comprise the formula to determine if an authentication value is within the authentication nominal variance, or if the value falls outside the threshold level of the authentication nominal variance.

An impact module 302 may be configured to determine the influence each attribute and/or each category of attributes may have on the authentication nominal variance. The influence for each attribute and or category of attributes may correspond to a weighted value. Further, the weighted value may dynamically change as a function of the type of interaction or transaction, an amount of the transaction, a frequency of the interaction or transaction, user parameters (or user contexts), and so forth.

Based on a rule-based pattern 304, the impact module 302 may be configured to apply more weight to the geospatial attributes than to the health attributes in certain situations. In an example, a user may have twisted her ankle and may be pregnant. This means that her stride may be different. Since her stride is different, she is probably taking fewer steps than usual and her heart rate may be higher because she is having to work harder to walk. If this is tracked over time (not immediate or immediately followed by a financial transaction or another type of interaction where authentication is required), the weight of the health attributes as a factor in the authentication may decrease, and the weight of the non-physical factors may increase.

In another example, I have a cold and my voice has changed. In this case, the voiceprint as one factor of the authentication may be downgraded without alarm provided all other factors are consistent. If one of the other factors fails, it might not be significant enough to block an interaction. Instead, I (as the user) may simply have to perform an extra step, as directed by the assessment module 208. In an example, the extra step may be a temporary code response challenge or other external action that is needed for input in order for the authentication (or interaction) to proceed.

Thus, the combination of the attributes in relation to other attributes, the user, and the circumstances may lead to an interaction being blocked or halted until the user undergoes an extra level of scrutiny. Based on the modification of the weighted value by the impact module 302 and/or based on the rule-based pattern 304, the system 300 may make a better determination as to who is actually being authenticated while the authentication procedure is being performed, during an initial attempt to conduct the interaction, as well as during the entire interaction.

In an alternative or additional implementation, the proximity of a user to an entity may be recognized. According to another implementation, a voice metric through an initial (or subsequent) phone contact may be recognized. The recognition of the proximity and/or voice metric of the user may be dynamically recognized with no manual entry or use of a card (e.g., ATM card, credit card, bank card, and so on). For example, the user may be welcomed using seamless preauthorization. Through the course of interaction, additional authentication may be triggered based on interaction types.

According to some implementations, the rule-based pattern 304 may take into account risk. For example, if the user is using an ATM is a bad section of town, it might be considered a higher risk interaction and additional authentication may be needed. In some implementations if a home address has changed in the last twenty-four hours, a limit on the ability to withdrawn money is placed on the user's account (e.g., may only withdraw up to $100 or up to $500). In another example, if the home address has changed within the last twenty-four hours, the user is not able to change their password online. Risk may also relate to what is occurring around the user (e.g., is it raining, is it dark out, is more than one person standing two feet away from the user, and so on), which is current context.

In accordance with some implementations, a context module 306 may be configured to determine a current context of a user, wherein the context is used to determine whether the user should be authenticated or should not be authenticated. The current context may be a behavioral pattern attribute, a health attribute, a device attribute, or other attributes. For example, the context module 306 may make a determination whether the user walked or ran to an ATM machine. In another example, the context module 306 may make a determination whether the user was riding a bicycle, riding in a vehicle, walking in hilly terrain, and so on. The context module 306 is different from the rules-based pattern 304 or rules-based engine because the context module 306 applies cognitive and semantic type analytics to the system 300.

The context module 306 may be configured to assess context attributes and/or acceptable ranges in context. The assessment may be based on prior history (historical data). Further, the assessment may be based on weightings assigned to different contexts (e.g., running versus walking, walking versus riding in a vehicle, and so on).

According to an implementation, the context module 306 may be configured to (and includes capabilities) to determine context through cognitive and semantic analytic analysis and populate a context weighting database with context situations, ratings, and potential associations. The database may be populated prior to an interaction, just prior to the interaction, at substantially the same time as the interaction, or at another time.

Figure 4:
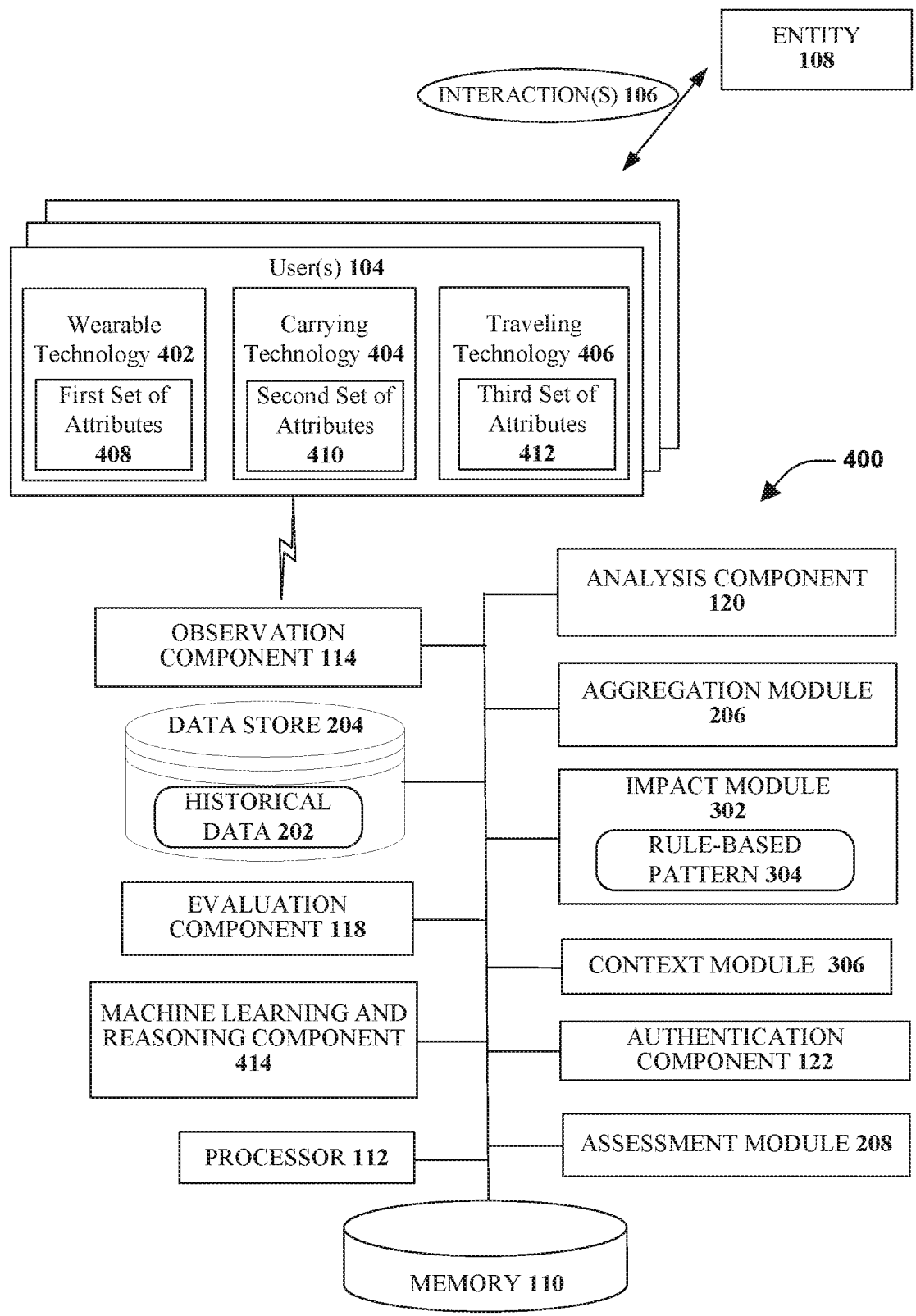
FIG. 4 illustrates an example, non-limiting system configured to dynamically authenticate a user at various points during an interaction with an entity, according to an aspect.

FIG. 4 illustrates an example, non-limiting system 400 configured to dynamically authenticate a user 104 at various points during an interaction 106 with an entity 108, according to an aspect. The system 400 may be configured to authenticate the user 104 during initiation of the interaction 106, at various points during the interaction 106, when a particular event occurs, or based on other criteria.

The observation component 114 may utilize various external devices associated with the user 104 to monitor the one or more attributes. Such external devices may include wearable technology 402 (e.g., a wearable device), carrying technology 404 (e.g., a carrying device), and/or travelling technology 406 (e.g., a traveling device). The wearable technology 402 may be various devices that may be worn and utilized to measure biological or health information of the user 104. For example, the wearable technology 402 may capture stride, steps, blood pressure (nominal variance), body temperature, sleep pattern (e.g., hours awake, hours asleep), and so on. In an example, a type of wearable technology 402 may be a health device that may be configured to register steps, blood pressure, home base, home location (e.g., geospatial location), and so on. The health device (and any of the other devices) does not need to be a particular type of device, provided the user authorizes the tracking and monitoring of information to perform the authentication. Thus, the disclosed aspects are device agnostic.

According to some implementations, the wearable technology 402 may be a heads up display, such as glasses, that are utilized to capture information external to the user. For example, a camera or other recording device may be utilized in accordance with the disclosed aspects to authenticate a user. In an implementation, the wearable technology 402 incorporates a chip, such as an RFID chip or another chip that may be utilized to capture data and convey the data to the system 400.

The carrying technology 404 may be any device that a user carries with them, such as mobile devices (e.g., mobile phone). The carrying technology 404 may capture travel patterns and voiceprints (e.g., listen in). The carrying technology 404 may facilitate partner application authentication and/or authenticate to a third party (pre-arranged) by text or other manner of communication.

The traveling technology 406 may be various devices that may capture information related to a location of the user (e.g., near an ATM, near or in a store, and so on) or geospatial data. The traveling technology 406 may determine a home location (e.g., where the user has been most frequently in the last four days, last week, previous thirty days, and so on). According to some implementations, the traveling technology 406 may facilitate vehicle authentication (e.g., authentication with vehicle, driving behavior check, and so on). In an aspect, the traveling device may capture current contextual information, time of day, weather, environmental quality in relation to proximity of the user, and so forth.

A first set of attributes 408 may be associated with the wearable technology 402, a second set of attributes 410 may be associated with the carrying technology 404, and a third set of attributes 412 may be associated with the traveling technology 406. Each attribute of the first set of attributes 408, the second set of attributes 410, and the third set of attributes 412 may be assigned a different authentication code according to the rule-based pattern 304.

For example purposes and not limitation, the traveling technology 406 may include five attributes in the third set of attributes, wherein each attribute is assigned a different authentication code (1a through 1d) according to Table 1 below:

TABLE 1

| Authentication Code | Description |
| --- | --- |
| 1a | Location-Near ATM, or Store |
| 1b | Travel patterning |
| 1c | Home Location (last 3 days) |
| 1d | Vehicle Authentication (authenticate with vehicle-driving behavior check) |

In this example, the wearable technology 402 may include five attributes in the first set of attributes 408. Each attribute may be assigned a different authorization code (2a through 2e) according to Table 2 below:

TABLE 2

| Authentication Code | Description |
| --- | --- |
| 2a | Stride |
| 2b | Steps |
| 2c | Blood Pressure-Nominal Variance |
| 2d | Body Temperature |
| 2e | Sleep Pattern (hours awake) |

Further, the carrying technology 404 may include four attributes in the second set of attributes 410. Each attribute may be assigned a different authorization code (3a through 3d) according to Table 3 below:

TABLE 3

| Authentication Code | Description Geo Location |
| --- | --- |
| 3a | Travel Pattern |
| 3b | Voice Print (Listen in) |
| 3c | Partner App Authentication |
| 3d | Authenticate to a third party (pre-arranged) by text |

The rule-based pattern 304 may include a table that provide a cross reference for each attribute that may be captured and applies a weighted authentication value to the authentication code. In the example Table 4 below, the weighted authentication value is given a weight value of 1 through 5, however, other weight values may be utilized. Further, it is noted that the table below is a sample representation and an actual cross reference table may include hundreds, or even thousands, of attributes and/or authentication codes.

TABLE 4

| Authentication Code | Weighted Authentication Value (1-5) |
| --- | --- |
| 1a | 1 |
| 1b | 3 |
| 1c | 2 |
| 1d | 4 |
| 1e | 2 |
| 2a | 4 |
| 2b | 3 |
| 2c | 3 |
| 2d | 3 |
| 2e | 1 |
| 3a | 2 |
| 3b | 4 |
| 3c | 2 |
| 3d | 5 |

The weighted authentication value of 1 in Table 4 instructs the assessment module 208 to request to authentication. The weighted authentication value of 2 instructs the assessment module 208 to fetch customer authentication profile. The weighted authentication value of 3 instructs the assessment module 208 that X of N factors are registered, which results in a base authentication score (X of N factors registered=base authentication score), where X and N are integers and X is less than or equal to N. Further, the weighted authentication value of 4 instructs the assessment module 208 to add weighted registrations, which results in an extended authorization value. The weighted authentication value of 5 instructs the assessment module 208 to test each authentication test (e.g., stride, home location, partner application, and so on). Further, the weighted authentication value of 6 instructs the assessment module 208 that successful authorization is equal to 1 and unsuccessful authorization is equal to 0. The base authentication score added to the sum of the authorization test score multiplied by the weighted values is equal to the total authorization value, as per the following equation.

$$\text{Base Auth Score} + (\text{Auth Test Score} * \text{weighted values}) = \text{TotalAuthValue}$$

Based on various authentication rankings, an action matrix is applied, as illustrated in example Table 5 below:

TABLE 5

| Authentication Rankings | Permission Levels | Monetary Limits | Authorization Limits |
| --- | --- | --- | --- |
| 1-3 | Low | Less than $100 transaction limit | ATM, Teller only |
| 4-6 | Medium | Less than $500 transaction limit | ATM, Teller, Wire, Multi-Account Transfer |
| 7-10 | High | Less than $9,999 transaction limit | All Plus Account Status Change |

Thus, based on the rule-based pattern 304 a determination may be made related to additional actions, if any, a user needs to take in order to complete or continue an interaction.

Using the above tables as an example, if the user is attempting to get $20 out of an account, the code may be 1C (Table 4), which may be a standard profile. However, if the user is trying to transfer over $1,000 between accounts, it may be an authorization code of 3B, which corresponds to weighted authentication value 4, which may be added weight registrations. In this case, the user's stride has to be the same, the user's step has to be the same, the user's blood pressure has to be nominal, and so on.

According to some implementations, automated learning may be employed to facilitate one or more of the disclosed aspects. For example, a machine learning and reasoning component 414 may be utilized to automate one or more of the disclosed aspects. The machine learning and reasoning component 414 may employ automated learning and reasoning procedures (e.g., the use of explicitly and/or implicitly trained statistical classifiers) in connection with determining whether a user may be automatically authenticated or whether additional action is necessary to continue the authentication process in accordance with one or more aspects described herein.

For example, the machine learning and reasoning component 414 may employ principles of probabilistic and decision theoretic inference. Additionally or alternatively, the machine learning and reasoning component 414 may rely on predictive models constructed using machine learning and/or automated learning procedures. Logic-centric inference may also be employed separately or in conjunction with probabilistic methods.

The machine learning and reasoning component 414 may infer a potential for fraudulent activity or potential fraud, for example, by obtaining knowledge about various logged information, such as historical data 202, which may include error logs and/or the level of errors. For example, if the current trend for fraud is higher for a particular interaction type, the machine learning and reasoning component 414 may automatically require the user to take additional action to complete the authentication, which may also be reflected in the rule-based pattern 304. In another example, based on a confidence level that the user is in fact the authorized user, the machine learning and reasoning component 414 may automatically authenticate the user and continue to authenticate the user during the entire interaction (or at least a portion of the interaction).

As used herein, the term "inference" refers generally to the process of reasoning about or inferring states of the system, a component, a module, the environment, external devices, mobile devices, wearable technology 402, carrying technology 404, traveling technology 406, and so on from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 414 has uncertainty related to the authentication of the user, the machine learning and reasoning component 414 may automatically engage in a short (or long) dialogue or interaction with the user (e.g., answer a security question, enter a temporary code, and so on). In accordance with some aspects, the machine learning and reasoning component 414 engages in the dialogue with the user through another system component and/or an external device.

The various aspects (e.g., in connection with authentication of a user at initiation of an interaction and at various times during the interaction, and so forth) may employ various artificial intelligence-based schemes for carrying out various aspects thereof. For example, a process for determining if particular biological or health factors of a user match an expected value or range of values, or have a value that is unexpected may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine the identity of a user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein may be inclusive of statistical regression that is utilized to develop models of priority.

One or more aspects may employ classifiers that are explicitly trained (e.g., through a generic training data) as well as classifiers that are implicitly trained (e.g., by observing historical patterns related to health, geolocation, devices, and so on). For example, SVM's may be configured through a learning or training phase within a classifier constructor and feature selection module. Thus, a classifier(s) may be used to automatically learn and perform a number of functions, including but not limited to determining according to a predetermined criteria when to automatically authenticate a user, which interaction types should have an additional authentication procedure, which interaction amounts should have an additional authentication procedure, and so on.

Additionally or alternatively, an implementation scheme (e.g., a rule, a policy, and so on) may be applied to control and/or regulate when and how a user is authenticated. In some implementations, based upon a predefined criterion, the rules-based implementation may automatically and/or dynamically implement one or more rules and/or confidence levels associated with a particular authentication procedure. In response thereto, the rule-based implementation may automatically interpret and carry out functions associated with the authentication procedure by employing a predefined and/or programmed rule(s) based upon any desired criteria.

As discussed herein the various aspects relate to passive authentication of users. The authentication may be implemented as a device application, according to an implementation. The authentication may use one or more of the following: geolocation, biometric, gesture-based ("What you do") prints, acoustic-based prints, acoustic forensics, photos, and so on. Various implementations may support multiple channels, such as at a store, al an ATM, motor banking, phone, and so on. Further, bi-directional authentication may be supported, wherein a user authenticates an entity and the entity authenticates the user.

In an example use case of card-less motor banking using the disclosed aspects, the interaction may be pre-staged by the customer prior to pulling up to the station. The customer is provided an expiration time for the pre-staged interaction and a one-time password (OTP). The customer provides the OTP to the banker and the banker may pull up the pre-staged interaction. Since the device and application is strongly bound to the customer, a combination of the above noted authentication factors may also be utilized.

In an example use case of immediate in-store recognition, a customer may walk into a store and all the bankers immediately know who s/he is because of the customer's bound device. The customer may have even pre-staged the interaction prior to entering the store and the pre-staged interaction may be accessible to all store bankers.

In an example use case of an international traveler, one code (independent of country) may be provided. For example, the user may open the application and obtain the code. An OTP may be utilized at login if the entity knows that the user is in a geo-location that is not typical to that customer.

In an example use case of a bi-directional authentication, a fraud banker may call and leave a message about a potential issue on a customer's voicemail. The customer may be uncertain whether the message is legitimate. Therefore, the customer calls the number that the fraud banker provides and uses an application to generate a code that the fraud banker will have to read back. In this case, the fraud banker will not be able to read back the code because the code is known only to the authentic entity.

Further, geo-location information and capabilities to detect fraud or assess risk are provided. The geo-location information may be either pushed to the entity by the customer or detected by the entity without the customer's knowledge.

According to a customer initiated pin drop use case example, a geo-location may be identified. For example, a customer either uses an entity's application to notify the entity of the customer's location or the entity detects the geo-location of the customer and proactively asks the customer to confirm the location. The entity may then factor the customer's geo-location into the risk analysis.

In accordance with a proximity link analysis (e.g., at risk customer) use case example, the entity's customer's devices are near a known "bad device," Thus, the risk scoring for these customer's will reflect their proximity to a "bad device," even though those customers are not necessarily victims of fraud.

An example proximity link analysis (potential bad device ID) use case relates to when a number of devices are near a known "bad device" and are accessing the entity's accounts. The entity may determine risk based on the fact that there is a possibility that the devices in question are part of a fraud ring (e.g., "fraud farm").

The ability of the entity (e.g., the systems disclosed herein) to know the real-time geo-locations of customers may be determined based on devices that may be strongly bound to customers. Such devices may be, but are not limited to, smartphones and wearables. The customer's geo-location may be used as a factor in fraud detection and risk assessments.

For example, fraud detection based on geo-location may be as straight forward as knowing that a customer is in Location A, but the customer's account is being accessed in Location Z. Further, risk assessment based on geo-location may also be as simple as knowing the customer is in a geo-location that the entity deems more risky.

In addition, geo-location information of multiple customers may be considered in their risk assessments if they are near a known "bad device," even if there is no fraud detected.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
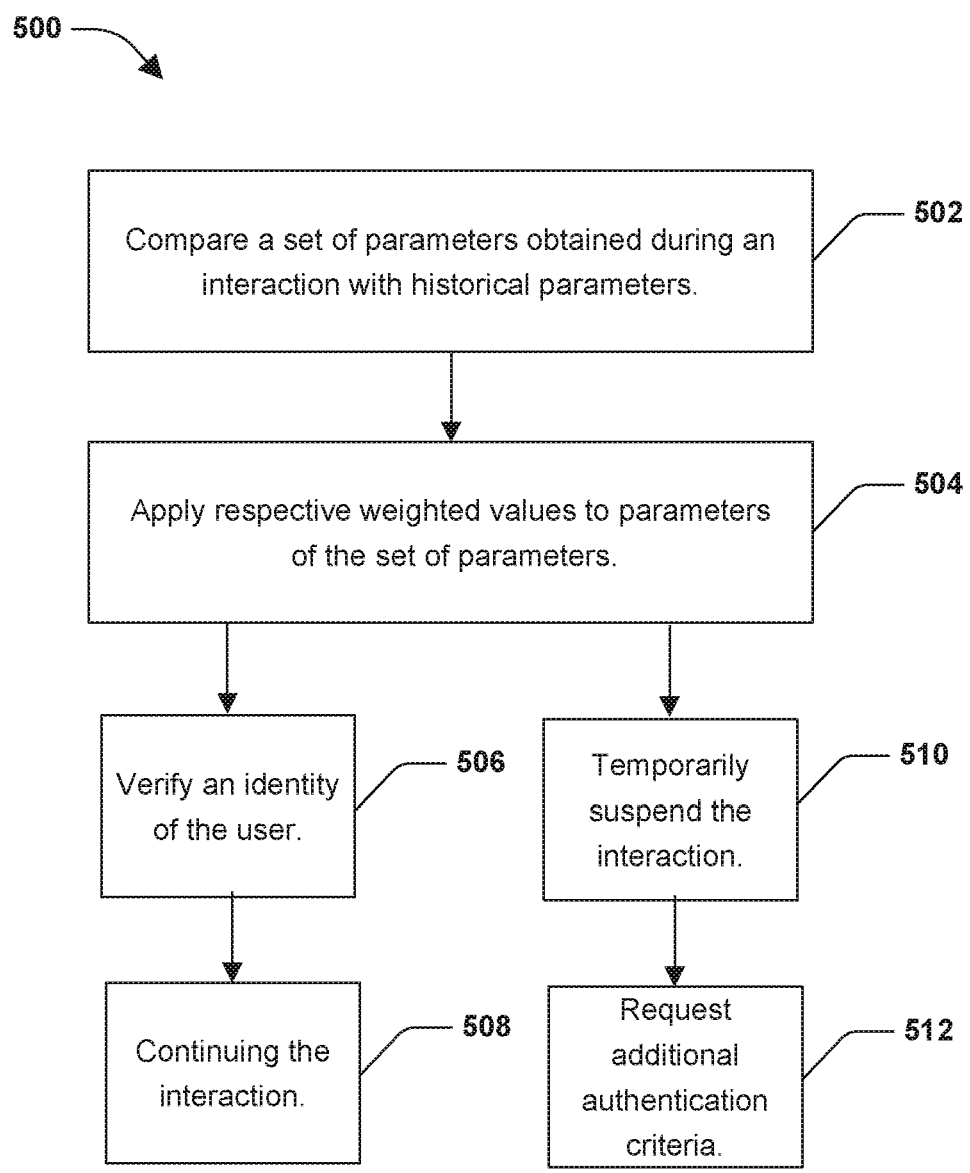
FIG. 5 illustrates an example, non-limiting method for performing relative multifactor authentication, according to an aspect.

FIG. 5 illustrates an example, non-limiting method 500 for performing relative multifactor authentication, according to an aspect. The method 500 in FIG. 5 may be implemented using, for example, any of the systems, such as the system 100 (of FIG. 1). The method 500 may be configured to authenticate a user at an initiation of an interaction and during the interaction.

The various aspects disclosed herein relate to relative multifactor authentication that uses a rules-based pattern to dynamically change the weight of one or more factors or attributes. The weight may be changed based on the individual attribute or based on a category of attributes. The authentication may be a constant or frequent, real-time (or near real-time) authentication process.

According to an implementation, continuous (or nearly continuous) monitoring in context can be performed. Such monitoring may provide the ability to pre-approve a particular interaction. The pre-approval may be performed since there is sufficient information to initiate authorized interaction for certain types of interactions based on the user providing their name or recognizing their presence. For example, a user may walk into a bank branch or up to an ATM and the user may be automatically welcomed. Further, an interaction or options of interactions may be provided because the user is identified based on their behavior, devices, and/or context and the fact that the user is at a specific location.

Further, the authentication may be tied to a device or a set of devices that include applications or other functionality to allow authentication for the associated user that selectively "opts in" to use relative multifactor authentication.

The disclosed aspects may utilize device-to-device pairing, monitoring, and reporting that may create and share patterns for authentication purposes. The disclosed aspects also provide a combination of diverse, real-time and patterned attributes that may serve as factors for authentication. In addition, known or authorized device, vehicles, and/or other technology may be utilize through set up, use, and/or biometrics. Additionally, the disclosed aspects utilize more authentication, or additional steps (e.g., temporary pin response challenge, third party referral, and so on) if real-time factors do not match a pattern or an expected factor.

The method 500 starts at 502, when a set of parameters obtained at substantially the same time as (e.g., prior to, just prior to, during, and so on) an interaction between a user and an entity are compared with historical parameters associated with the user. The set of parameters may be obtained at about the same time as a user requests access to a resource, wherein authorization is needed before the resource may be accessed. For example, each authentication parameter of the set of authentication parameters may be associated with a distinct parameter. For example, at least one parameter may be obtained at initiation of the interaction. In another example, at least one parameter may be obtained during the interaction and subsequent to at least one other verification of the user. For example, a user may initiate an interaction with the entity over the Internet. The user may be verified and a first screen is presented to a user. At about the same time as the user selects an action (e.g., view balances, make a payment, transfer money, view a second screen, and so on), a second authentication procedure may be performed according to an aspect.

The historical parameters may be parameters that were obtained during a previous verified encounter with the user. Such parameters may be obtained over a period of time (e.g., hours, days, weeks, and so on). Further, the parameters may be obtained continuously, periodically, at defined intervals, randomly, when an event occurs, or based on other temporal aspects.

According to an implementation, the set of parameters may include geospatial parameters, biological parameters, health parameters, device parameters and/or other forms of current context. The geospatial parameters may include information related to typical travel patterns of a user (e.g., a common route to work, a common route from work, a common route on the weekends, usual stops, and so on). Another geospatial parameter may include locations where a user typically goes (e.g., a work location, home, babysitter, store, friend's house, and so on). Another geospatial parameter may include a duration (e.g., how long the user typically stays at each location, how often the user travels to the location, and so forth). For example, a user may be at a work location for nine hours during the week, such as Monday through Friday. In another example, the user may go grocery shopping on Saturday morning and, on average spends forty-five minutes in the grocery store. In a further example, the user may travel to a dentist office every six months and spends an average of seventy-three minutes at the dentist office.

The biological parameters and/or health parameters may include biometrics, physiological, and/or physical attributes. Such attributes may include the number of steps a user takes each day, a normal stride length for the user, an average blood pressure, an average heart rate, typical sleep patterns, and so on.

The device parameters may include a personal device associated with the user and that is with the user at the time of the attempted interaction. In another example, the device parameters may be a voiceprint or other type of voice recognition that verifies the user is present at the time of the attempted interaction. Alternatively or additionally, the user may be verified with facial recognition. In another example, the device parameters may be that a car is present and connected to the device through a wired or wireless communication media. According to some implementations, the proximity determination may be through personal tracking, which may include personal proximity to a device.

At 504, respective weighted values are applied to parameters of the set of parameters. The weight values applied to each parameter may be based on the interaction being attempted. For example, in a first type of interaction, more weight may be applied to the geospatial parameters and less weight may be applied to the health parameters. In another example, the device parameters might be given a higher weight as compared to the health parameters, and so on.

The respective weighted values may be determined as a function of the interaction and an observed condition of the user. For example the interaction may involve a large dollar amount (e.g., over $10,000), may be initiated at an unusual geographic location (e.g., in France when the user has never traveled to France before), or may involve an unusual interaction type (e.g., wire transfer when the user has never performed a wire transaction previously). The observed condition of the user may relate to a medical condition that the user is currently experiencing (e.g., a cold, a broken leg, hiccups, exercising, and so on).

For example, for a geospatial authentication factor, the determination may be whether the user is traveling an expected route or is traveling an unexpected route. In another example, a determination may be that the user has a heart rate range that is within an average range, or whether the heart rate is at an increased (or a decreased) level. In yet another example, a determination may be that a sampling of the user's voice matches an expected pattern, or does not match the expected pattern.

The method 500 may selectively authenticate the user. According to an aspect, based on a determination that a sum of the weighted value is within a threshold range of values, at 506, the identity of the user is verified and, at 508, the interaction is allowed to continue. In an alternative implementation, based on a determination that the sum of the weighted values is outside the threshold range of values, at 510, the interaction is temporarily suspended and, at 512, additional authentication criteria is requested from the user.

According to some implementations, the user may be dynamically rewarded based on approval of a determined level of authentication. For example, in return for utilizing a higher level of authentication, the user is provided a reward (e.g., reduced fees, increased interest rates, reduced loan rates, and/or other benefits). The determined level of authentication may be tied to the interaction. In an aspect, the determined level of authentication is the use of a particular technique (e.g., a tracking device or another type of monitoring device).

Figure 6:
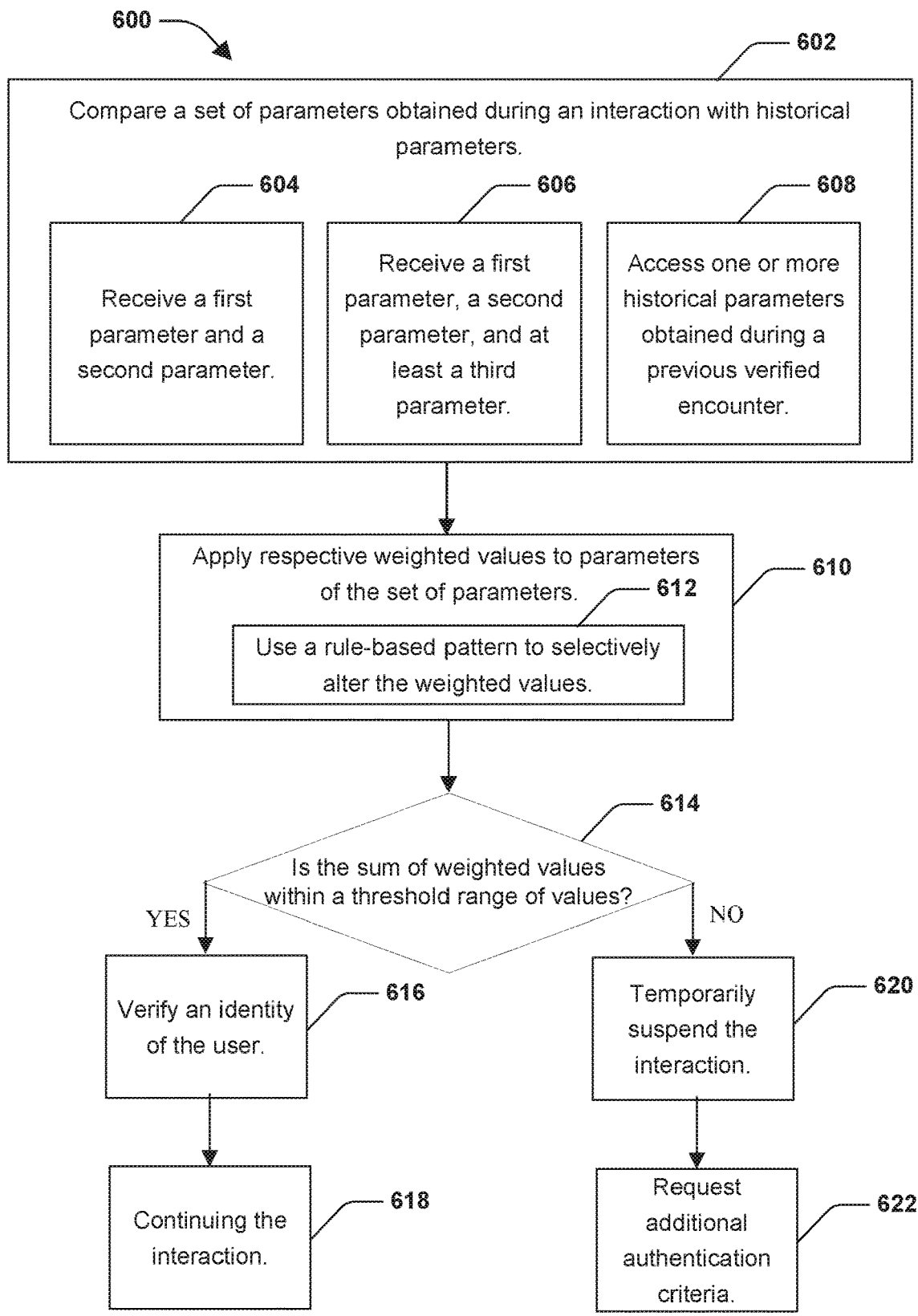
FIG. 6 illustrates an example, non-limiting method for relative multifactor authentication, according to an aspect.

FIG. 6 illustrates an example, non-limiting method 600 for relative multifactor authentication, according to an aspect. The method 600 in FIG. 6 may be implemented using, for example, any of the systems, such as the system 200 (of FIG. 2). The method 600 may be configured to continuously and seamlessly authenticate a user at various points during the interaction.

The method 600 starts, at 602, when a set of parameters obtained during, or prior to, an interaction between a user and an entity is compared to one or more historical parameters. For example, a first set of parameters may be obtained at initiation of an interaction and a second set (or further subsequent sets) of parameters are obtained at various points during the interaction.

The historical parameters may be obtained during a previous confirmed interaction with the user or at other times. According to some implementations, the historical parameters are obtained by an external device and maintained by a third party supplier. For example, fitness information may be obtained by an activity monitor and a sponsor of the activity monitor may track the user's activity and various other data on an hourly, daily, weekly, or other temporal manner.

According to an implementation, comparing the parameters may include receiving, at 604, a first parameter related to a health attribute and a second parameter related to a behavioral attribute. In an alternative implementation, comparing the parameters may include receiving, at 606, a first parameter related to a health attribute, a second parameter related to a geospatial attribute, and at least a third parameter related to a device attribute (e.g., a current context). According to some implementations, the various attributes (or contexts) may include historical data. Further, some data may come from prior behavior, prior health, prior geospatial data, prior device data, and so on. The prior history may be utilized in context with a current activity.

Further, comparing the parameters may include, at 608, accessing one or more historical parameters obtained during a previous verified encounter with the user. For example, during a period when there is a high confidence that the user is the authorized user, various data may be collected and retained in a retrievable format.

At 610, respective weighted values are applied to parameters of the set of parameters. For example, there are four parameters, wherein two of the parameters relate to behavioral patterns, one parameter relates to a health parameter, and one parameter relates to a device parameter. In this situation, it may be determined that the user is fighting the flu and is not exercising as much as usual. Therefore, the health parameter may be given a low weight, while the behavioral patterns are given a high weight, and the device parameter is given a medium weight. Thus, according to an implementation, at 612, a rule-based pattern may be used to selectively alter the weighted values. For example, the weighted values may be altered based on an interaction condition, a user condition, a current context, or combinations thereof. The interaction condition may be the location of the interaction (e.g., in person at a bank, online with the user's computer, over the telephone, and so on). The interaction condition may also be the type of interaction (e.g., account balance review, withdrawal, address change, loan processing, loan payment, execute a power of attorney, and so on.) Additionally or alternatively, the interaction condition may be the type of risk factors involved with a particular interaction, historical analysis (e.g., interactions where fraud has occurred in the past, whether directed to the particular user, to the interaction, or to the location). The user condition may be a change in the user's health, routine, or other factors.

A determination is made whether the user should be verified. The determination may include, at 614, determining if a sum of the weighted values is within a threshold range of values. If the sum is within the threshold range of values ("YES"), the method 600 continues at 616 and the identity the user is verified and, at 618, the interaction is allowed to continue.

If the decision at 614 is that the sum of weighted values is not within the threshold range of values ("NO") it indicates the sum is outside of the range of values. In this case, the method 600 continues at 620 and the interaction is temporarily suspended and, at 622, additional authentication criteria is requested. For example, it may be determined that a user's travel pattern has recently changed and, further, the user's voice print is not the same (or any combination of tracking items begins to fail) extra authentication steps may need to be taken. For example, if the travel pattern is different and the user is working with a teller at a bank, the teller may ask the user if he has moved recently, or may check the user's driver's license to see if the license has been updated.

In another example, alerts (e.g., text messages, phone calls, mail) may be sent to the user indicating that the bank has noticed the user has not been going to the same house the last two weeks and the user's home address needs to be re-verified (e.g., in a proactive manner). If the user receives the alert and is still in the same house, it might indicate that fraud is about to occur (or has been occurring). In this manner, fraud may be proactively mitigated on the customer's account. This also ties into the mitigation of identity theft and, rather than detecting the identity theft after it occurs, the disclosed aspects may be able to notice a change that may indicate identity theft is likely to occur in the near future.

If a response to the additional authentication criteria is correct (e.g., matches an expected response), the user is verified and the interaction is allowed to continue. However, if the response is not the expected response, the interaction may be cancelled or another action taken, such as requesting additional authentication criteria.

Figure 7:
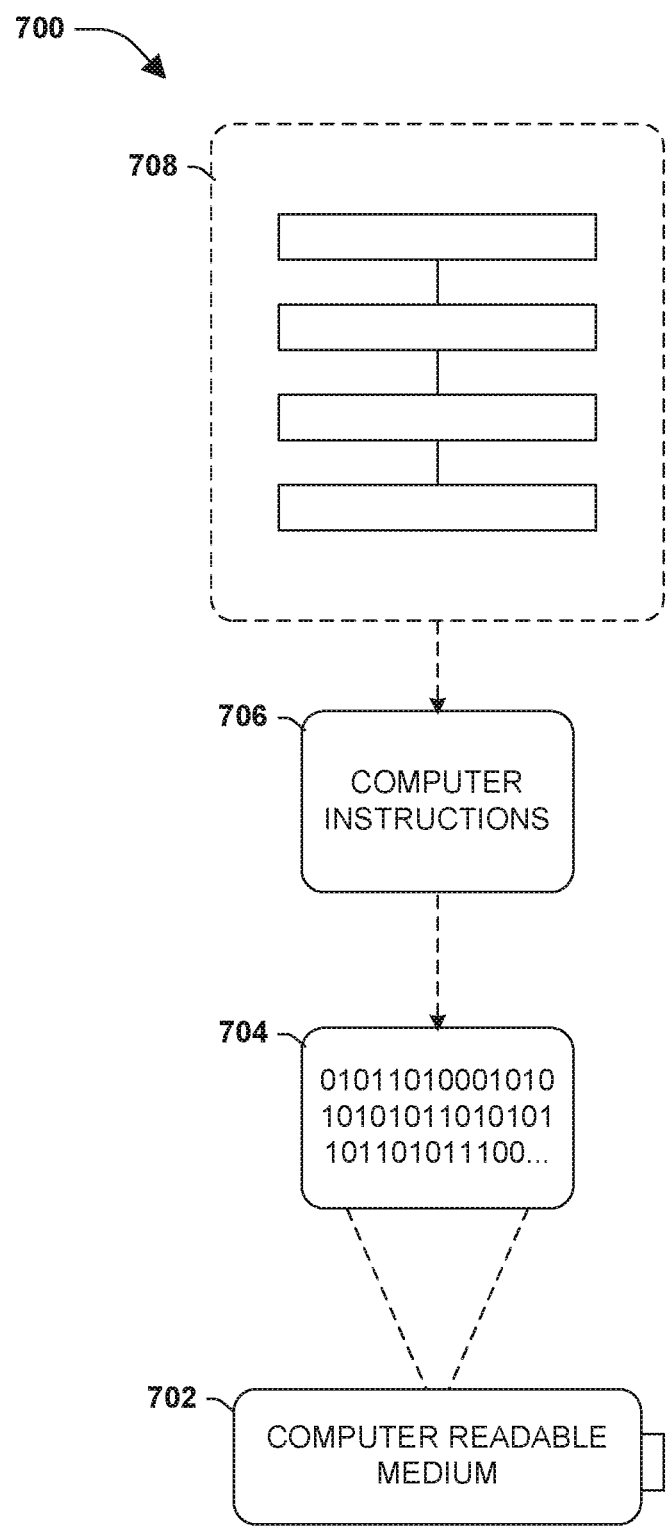
FIG. 7 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the processor-executable computer instructions 706 may be configured to perform a method 708, such as the method 500 of FIG. 5 and/or the method 600 of FIG. 6, for example. In another embodiment, the processor-executable instructions 704 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a session, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
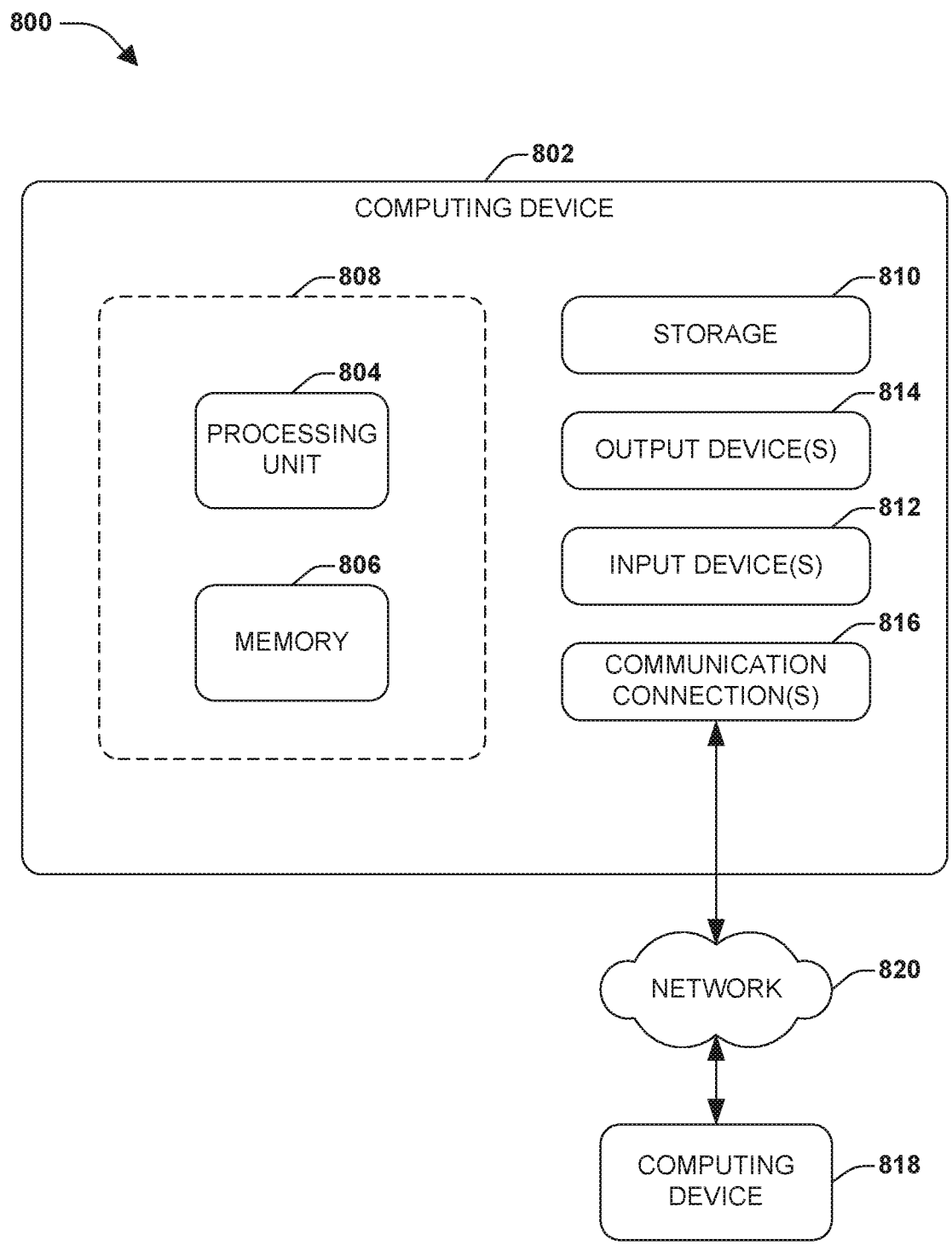
FIG. 8 illustrates an example, non-limiting computing environment where one or more of the aspects set forth herein are implemented, according to one or more embodiments.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, non-volatile, such as ROM, flash memory, etc., or a combination thereof. This configuration is illustrated in FIG. 8 by dashed line 808.

In other embodiments, the device 802 may include additional features or functionality. For example, the device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the device 802. The input device(s) 812 and the output device(s) 814 may be connected to the device 802 via a wired connection, wireless connection, or any combination thereof. In one or more embodiments, an input device or an output device from another computing device may be used as the input device(s) 812 and/or the output device(s) 814 for the device 802. Further, the device 802 may include communication connection(s) 816 to facilitate communications with one or more other devices, illustrated as a computing device 818 coupled over a network 820.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method comprising:
   determining, using a processor, a current context of a user through cognitive and semantic analytic analysis to determine whether the user should be authenticated for a particular transaction between the user and an entity;
   comparing, by the processor, a respective set of parameters of a set of attributes obtained continuously during an interaction between the user and the entity with historical parameters;
   generating, by the processor, respective weighted values to parameters of the set of parameters being obtained at various points during the interaction;
   dynamically applying, by the processor, the respective weighted values to parameters of the set of parameters as a function of a type of the transaction and an observed condition of the user during the transaction; and performing, by the processor:
when a determination that a sum of the weighted values is within a threshold range of values, verifying an identity of the user, and allowing the user to continue with the transaction; and
when a determination that the sum of the weighted values is outside the threshold range of values, temporarily suspending the transaction, and requesting additional authentication criteria from the user.

2. The method of claim 1, wherein the set of parameters are captured by a set of devices associated with the user.

3. The method of claim 2, wherein a device of the sets of devices is an implanted device.

4. The method of claim 1, where a respective attribute of the set of attributes is associated with an attribute category selected from a group comprising geospatial attributes, biological attributes, health attributes, or device attributes.

5. The method of claim 4, wherein a weight value of a first category of attribute is different than a weight value of a second category of attribute.

6. The method of claim 5, the method further comprising:
over a period of time, adjusting the weight of the first category upwards and the weight of the second category downwards.

7. The method of claim 1, wherein the respective weighted values are based on a lookup table that stores authentication codes and weight values, each authentication code associated with at least one attribute of the set of attributes.

8. A non-transitory computer-readable medium comprising instructions, which when executed by at least one processor, configure the at least one processor to perform operations comprising:
determining a current context of a user through cognitive and semantic analytic analysis to determine whether the user should be authenticated for a particular transaction between the user and an entity;
comparing a respective set of parameters of a set of attributes obtained continuously during an interaction between the user and the entity with historical parameters;
generating respective weighted values to parameters of the set of parameters being obtained at various points during the interaction;
dynamically applying the respective weighted values to parameters of the set of parameters as a function of a type of the transaction and an observed condition of the user during the transaction; and
performing:
when a determination that a sum of the weighted values is within a threshold range of values, verifying an identity of the user, and allowing the user to continue with the transaction; and
when a determination that the sum of the weighted values is outside the threshold range of values, temporarily suspending the transaction, and requesting additional authentication criteria from the user.

9. The non-transitory computer-readable medium of claim 8, wherein the set of parameters are captured by a set of devices associated with the user.

10. The non-transitory computer-readable medium of claim 9, wherein a device of the sets of devices is an implanted device.

11. The non-transitory computer-readable medium of claim 8, where a respective attribute of the set of attributes is associated with an attribute category selected from a group comprising geospatial attributes, biological attributes, health attributes, or device attributes.

12. The non-transitory computer-readable medium of claim 11, wherein a weight value of a first category of attribute is different than a weight value of a second category of attribute.

13. The non-transitory computer-readable medium of claim 12, wherein the operations further include:
over a period of time, adjusting the weight of the first category upwards and the weight of the second category downwards.

14. The non-transitory computer-readable medium of claim 8, wherein the respective weighted values are based on a lookup table that stores authentication codes and weight values, each authentication code associated with at least one attribute of the set of attributes.

15. A system comprising:
at least one processor; and
a storage device comprising instructions, which when executed by the at least one processor, configure the at least one processor to perform operations comprising:
determining, using a processor, a current context of a user through cognitive and semantic analytic analysis to determine whether the user should be authenticated for a particular transaction between the user and an entity;
comparing, by the processor, a respective set of parameters of a set of attributes obtained continuously during an interaction between the user and the entity with historical parameters;
generating, by the processor, respective weighted values to parameters of the set of parameters being obtained at various points during the interaction;
dynamically applying, by the processor, the respective weighted values to parameters of the set of parameters as a function of a type of the transaction and an observed condition of the user during the transaction; and
performing, by the processor:
when a determination that a sum of the weighted values is within a threshold range of values, verifying an identity of the user, and allowing the user to continue with the transaction; and
when a determination that the sum of the weighted values is outside the threshold range of values, temporarily suspending the transaction, and requesting additional authentication criteria from the user.

16. The system of claim 15, wherein the set of parameters are captured by a set of devices associated with the user.

17. The system of claim 16, wherein a device of the sets of devices is an implanted device.

18. The system of claim 15, where a respective attribute of the set of attributes is associated with an attribute category selected from a group comprising geospatial attributes, biological attributes, health attributes, or device attributes.

19. The system of claim 18, wherein a weight value of a first category of attribute is different than a weight value of a second category of attribute.

20. The system of claim 19, wherein the instructions further configure the system to perform an operation of:
over a period of time, adjusting the weight of the first category upwards and the weight of the second category downwards.

* * * * *

UNITED STATES PATENT AND TRADEMARK OFFICE
CERTIFICATE OF CORRECTION

| | | |
|---|---|---|
| PATENT NO. | : 11,599,619 B1 | Page 1 of 1 |
| APPLICATION NO. | : 17/644482 | |
| DATED | : March 7, 2023 | |
| INVENTOR(S) | : Duke et al. | |

It is certified that error appears in the above-identified patent and that said Letters Patent is hereby corrected as shown below:

On the Title Page

On page 2, in Column 1, under "U.S. Patent Documents", Line 7, delete "2010/0011561" and insert --2010/0115610-- therefor Signed and Sealed this
Thirtieth Day of May, 2023

Katherine Kelly Vidal
*Director of the United States Patent and Trademark Office*